:m
(12) United States Patent
Timmins et al.

(10) Patent No.: US 9,507,114 B2
(45) Date of Patent: Nov. 29, 2016

(54) PASSIVE OPTICAL LAN INTERCONNECT APPARATUS

(71) Applicant: Optical Cable Corporation, Roanoke, VA (US)

(72) Inventors: Ian J. Timmins, Asheville, NC (US); Nicholas Uhland, Asheville, NC (US); James Yanik, Asheville, NC (US)

(*) Notice: Subject to any disclaimer, the term of this patent is extended or adjusted under 35 U.S.C. 154(b) by 7 days.

(21) Appl. No.: 14/610,742

(22) Filed: Jan. 30, 2015

(65) Prior Publication Data

US 2015/0219865 A1 Aug. 6, 2015

Related U.S. Application Data

(60) Provisional application No. 61/934,401, filed on Jan. 31, 2014.

(51) Int. Cl.
G02B 6/44 (2006.01)
H04Q 1/02 (2006.01)
G02B 6/38 (2006.01)

(52) U.S. Cl.
CPC ........... *G02B 6/4452* (2013.01); *G02B 6/4446* (2013.01); *H04Q 1/021* (2013.01); *G02B 6/3897* (2013.01)

(58) Field of Classification Search
None
See application file for complete search history.

(56) References Cited

U.S. PATENT DOCUMENTS

| 7,546,018 B2 | 6/2009 | Hendrickson et al. |
| 7,548,680 B2 | 6/2009 | Castonguay et al. |
| 8,437,597 B2 | 5/2013 | Cooke et al. |
| 2008/0205843 A1* | 8/2008 | Castonguay ......... G02B 6/3897 385/135 |

FOREIGN PATENT DOCUMENTS

| CN | 101221272 B | 12/2013 |
| WO | 2008088675 A2 | 7/2008 |

OTHER PUBLICATIONS

US RE44,498, 09/2013, Castonguay et al. (withdrawn)

* cited by examiner

*Primary Examiner* — Jerry Rahll
(74) *Attorney, Agent, or Firm* — The Van Winkle Law Firm; William G. Heedy; David M. Carter

(57) ABSTRACT

A fiber optic cable connectivity assembly for managing fiber optic interconnections includes a cabinet having an outer facing surface and an inner facing surface surrounding an interior cavity: an adapter bracket that is selectively positionable between a raised position and a lowered position, and the adapter bracket being configured for selective connection with at least one adapter component; a first mounting connector and an oppositely disposed second mounting connector each being secured to the inner facing surface of the cabinet, and each of the first and second oppositely disposed mounting connectors including a plurality of protruding components extending therefrom; and a first extension arm and an oppositely disposed second extension arm each being secured to the adapter bracket, and each of the first and second oppositely disposed extension arms defining a plurality of L-shaped cutout sections each being correspondingly aligned for engaged receipt of one of the plurality of protruding components to permit arcuate pivoting motion of the adapter bracket relative to the cabinet.

17 Claims, 5 Drawing Sheets

PASSIVE OPTICAL LAN INTERCONNECT APPARATUS

This patent application is based on and claims priority to provisional patent application Ser. No. 61/934,401 filed on Jan. 31, 2014.

BACKGROUND OF THE INVENTION

Field of the Invention

The invention relates to the field of cabinets for rack mount, wall mount, floor mount and ceiling mount fiber optic installations that utilize both fiber optic splices, fiber optic couplers, and cartridge style housings for electronic and fiber connections.

Discussion of the Related Art

Cabinets for fiber optic connections and terminations are commonplace in the art of optical transmission systems, but as data networks become more complex, the need for efficiency in fiber optic cable management grows. Cabinets for modern fiber optic systems require capacity for more cable entry and exit routes, additional space for connection and termination equipment, better access for maintenance, new techniques for security, and advancements in protective features that prevent contamination and system degradation due to unwanted physical forces on the cables, particularly for ceiling mount applications.

Prior developments in fiber optic cable management have focused more heavily on cable features and relied less on cabinet advancements to maximize optical data transmission. Certain cabinet advancements of note, however, have included the addition of a swivel functionality to a cabinet that houses fiber optic interconnections (illustrated in U.S. Pat. No. 7,546,018 (Hendrickson 2009)), as well as an angular pivoting function shown in FIG. 2C of U.S. Pat. No. 7,548,680 (Castonguay 2009). These prior kinds of installations do not necessarily support rack mount style connectivity installations and maintenance. Furthermore, prior designs fail to take into account the need for increased clearance that would be necessary in a rack or other enclosure in order to take advantage of the traditionally known swiveling or pivoting functions of the prior art.

Considerations of space are particularly relevant in the art of local area networks that are installed in offices or multi-dwelling housing developments, given the magnitude of the connections necessary to serve the users. These considerations are made more acute by the fact that fiber optic cable enclosures in multi-user environments are likely to be mounted in an overhead position, such as a drop ceiling structure. In particular, passive optical LANs often utilize a ceiling mount cabinet that is placed in a drop ceiling by replacing one half of a tile. This position for the installation and the particular requirements of local area networks in multi-user environments presents a need in the art of fiber optic cable cabinets for features that provide better and more convenient access to the fiber and cables, while providing system integrity and accuracy.

SUMMARY OF THE INVENTION

One form of the present invention is directed to a fiber optic cable connectivity assembly for managing fiber optic interconnections including a cabinet having an outer facing surface and an inner facing surface surrounding an interior cavity; an adapter bracket that is selectively positionable between a raised position and a lowered position relative to the cabinet, and the adapter bracket being configured for selective connection with at least one adapter component; a first mounting connector and an oppositely disposed second mounting connector each being secured to the inner facing surface of the cabinet, and each of the first and second oppositely disposed mounting connectors including a plurality of protruding components extending therefrom: and a first extension arm and an oppositely disposed second extension arm each being secured to the adapter bracket, and each of the first and second oppositely disposed extension arms defining a plurality of L-shaped cutout sections each being correspondingly aligned for engaged receipt of one of the plurality of protruding components.

Another form of the present invention is directed to a fiber optic connectivity apparatus for managing fiber optic interconnections including a cabinet having an outer facing surface and an inner facing surface surrounding an interior cavity; an adapter bracket that is pivotally secured to the inner facing surface of the cabinet, the adapter bracket being selectively positionable between a raised position for storage and a lowered position for maintenance of the fiber optic interconnections; and at least one fiber optic cartridge structured and disposed for deployment of a plurality of fiber optic channels contained in a single cable to separate channels, and the at least one fiber optic cartridge being sized and configured for selective connection with the adapter bracket.

Yet another form of the present invention is directed to a fiber optic connectivity apparatus for managing fiber optic interconnections including a cabinet including an top surface, a bottom surface and a sidewall extending therebetween and surrounding an interior cavity, and the bottom surface being defined by a lid that is selectively displaceable for accessing the interior cavity of the cabinet; an adapter bracket that is pivotally secured to the inner facing surface of the cabinet, the adapter bracket being selectively positionable between a raised position for storage and a lowered position for maintenance of the fiber optic interconnections; and at least one fiber optic cartridge structured and disposed for deployment of a plurality of fiber optic channels contained in a single cable to separate channels, and the at least one fiber optic cartridge being sized and configured for selective connection with the adapter bracket.

BRIEF DESCRIPTION OF THE DRAWINGS

For a fuller understanding of the nature of the present invention, reference should be made to the following detailed description, taken in conjunction with the accompanying drawings in which.

DETAILED DESCRIPTION

Referring to the several views of the drawings, the fiber optic cable connectivity cabinet assembly of the present invention is shown and is generally indicated as 10.

The installation and use of Passive Optical LANs in the office environment require a distinctly different architecture for deployment when compared to conventional LANs. The fiber installation assemblies disclosed herein utilize the development of multiple features that provide easier implementation in the office environment, specifically when an enclosure is mounted in an overhead position, such as in a drop ceiling structure. These features include, but are not limited to:

1. A novel latching mechanism for adapter plates when located in an overhead position with the ability to rotate into a serviceable position.
2. An innovatively shaped fiber optic cartridge for the deployment of multiple fiber optic channels contained in a single cable to separate channels within the enclosure with the shape of the cartridge being suitable for rotation out of the structure.
3. A mounting system for adapter plates that allows the plates to be oriented in three distinct positions maximized for use of space and serviceability.
4. A concealing and cable management system to support the use of optical splitters and subsequent break out channels located in an overhead position.
5. An adapter plate and mounting mechanism for a small profile wall-mount box that is easily removable.

Figure 1:
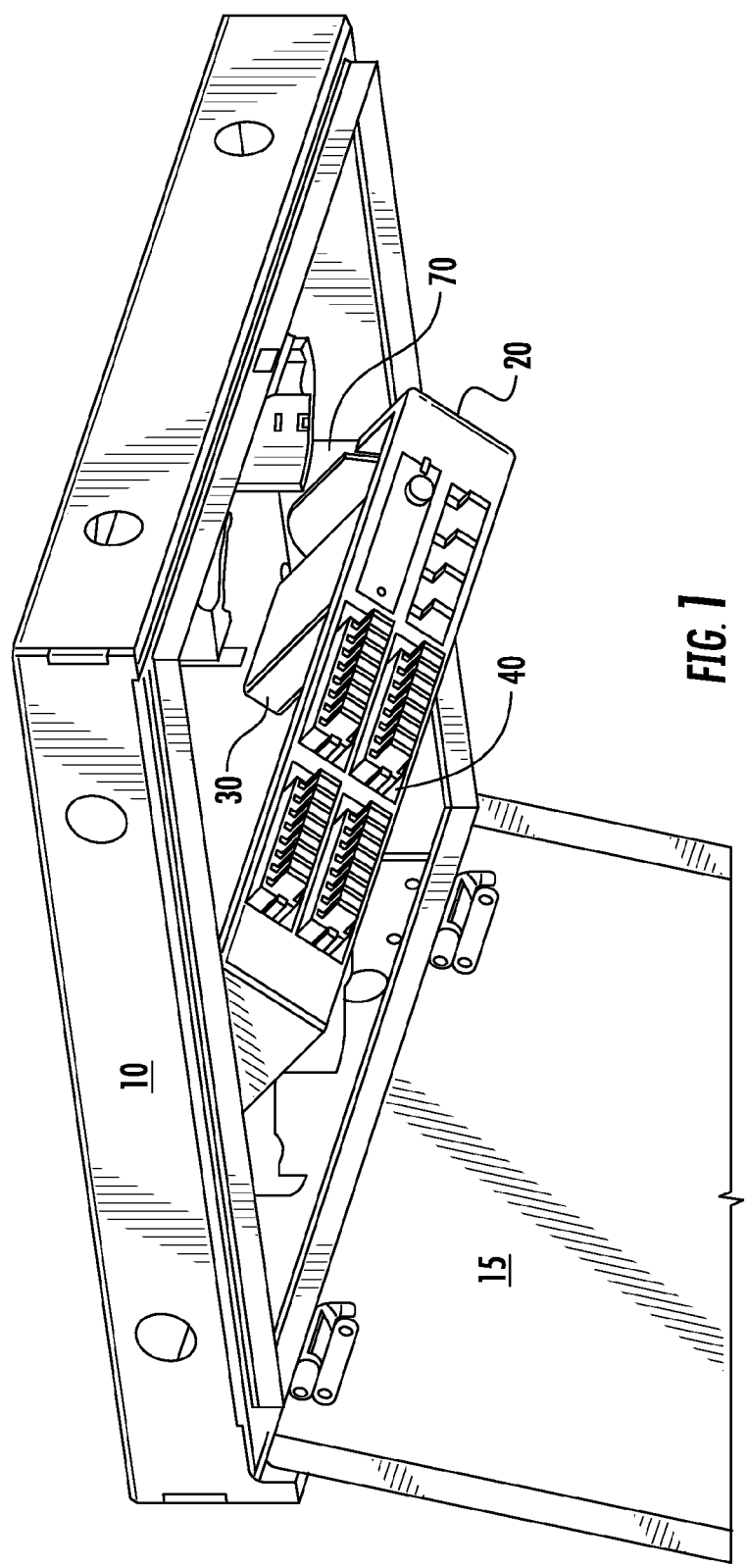
FIG. 1 is a perspective view of the fiber optic connectivity cabinet of the present invention in accordance with one embodiment.

The attached figures illustrate the above-noted features with reference to the following components in the illustrations:

10—Cabinet
15—Lid
20—Adapter Bracket
22—Swell Latch
25—Raised Bracket
30—Cartridge
40—Adapter Plate
50—Grooves for Railing
60—Adapter Bracket Mounting Bar
70—Adapter Bracket Mounting Connector FIG. 1 is an overview illustration of a first embodiment of the fiber optic cable connectivity cabinet assembly (10) disclosed herein. An adapter bracket (20) is structured for engaged receipt of a plug-in cartridge (30) for fiber connectivity and data transmission. The adapter bracket (20) is also amenable to standard adapter plates (40) for receiving fiber optic cables therein. The adapter bracket (20) is connected to the fiber cabinet (10) via an adapter bracket mounting connector (70) that enables a pivoting function in regard to the adapter bracket (20) relative to the cabinet. As shown, the entire adapter bracket (20) swings upward for enclosing the connectors within the cabinet (10) via an associated lid (15). Upon opening the lid (15), the adapter bracket (20) may be pulled downward to an angled position via the mounting connector (70). This angled arrangement provides an opportunity for the fiber connections within the cabinet (10) to be serviced or updated.

Figure 2:
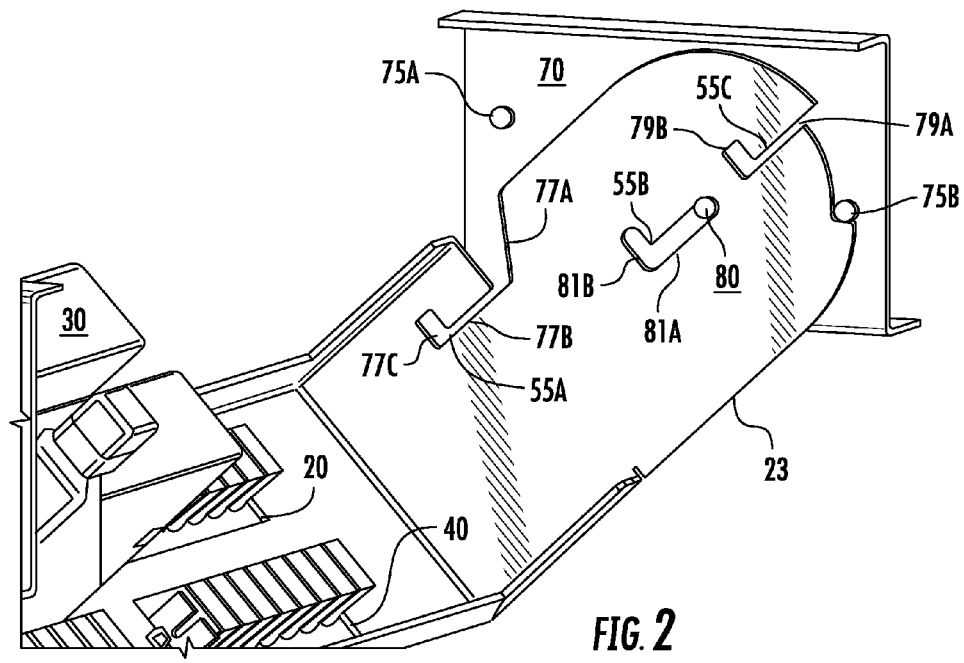
FIG. 2 is an isolated perspective view of the adapter bracket at an angled position relative to the mounting connector.

FIG. 2 illustrates how the overall adapter bracket (20) of FIG. 1 connects to the cabinet (10) via the mounting connector (70) to allow the pivoting function. The adapter bracket (20) includes extension arms (23) on opposite ends of the adapter bracket. The extension arms (23) define cut out sections (55A, 55B, 55C), e.g., an L-shaped cut out section, which each mate with corresponding protrusion components (75A, 80, 75B) extending from the mounting connector (70). In the non-limiting example of FIG. 2, the extension arm (23) pivots about a main central pin (80) projecting from one face of the mounting connector (70) and engages a center rail (55B) defined by a cut out section in the extension arm (23). The relationship of the main pin (80) and the center rail (55B) provides an arcuate pivoting functionality to the adapter bracket (23), allowing the adapter bracket (20) and associated fiber connectors to be lowered for access as shown in FIG. 1 and then raised for compact storage.

Figure 3:
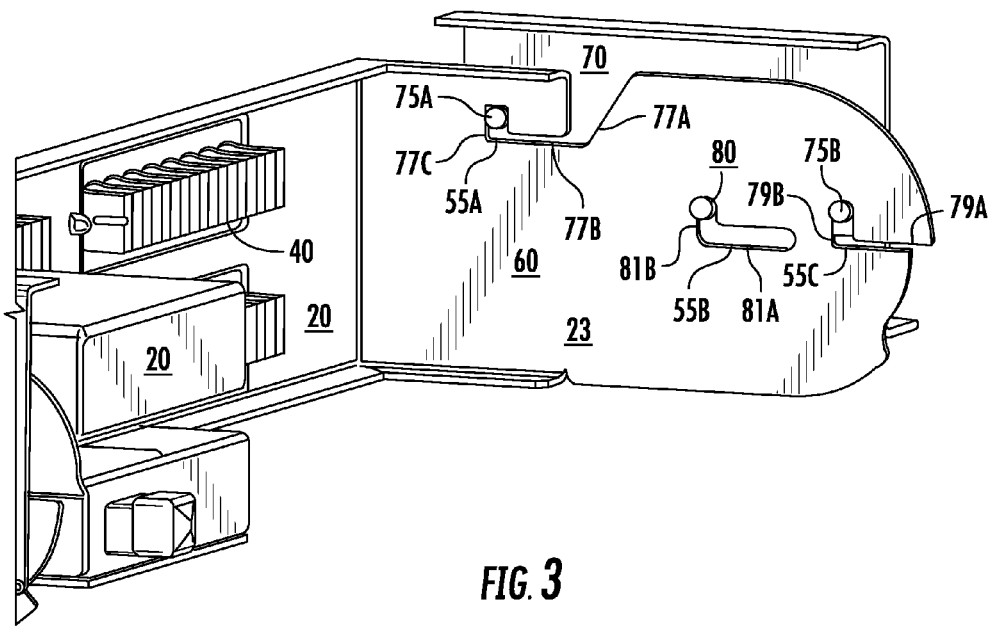
FIG. 3 is an isolated perspective view of the adapter bracket at an upright position relative to the mounting connector.

FIG. 3 illustrates that the adapter bracket (20) can be pivoted to an upright position for enclosing within the cabinet (10) by lifting the adapter bracket (20) upward, pivoting the extension arm (23) about the main pin (80), and allowing a first pin (75A) to glide along a first portion (77A) of a first cut out section (55A) in the extension arm (23). Upon reaching a stop point of the first cut out portion (77A) of the first cut out section (55A), the first pin (75A) rests at an entry point of a second portion (77B) of the cut out section (55A). Simultaneously, a second pin (75B) projecting from the mounting connector (70) engages a corresponding entry point to a sliding portion (79A) of a third cut-out section (55C). At this point, the entirety of the adapter bracket (20) can be pushed into a closed position by sliding the extension arms (23) laterally so that the pins (75A, 75B) move horizontally along respective horizontal rail portions (77B, 81A, 79A) in respective cut out sections (55A, 55B, 55C). Finally, the weight of the adapter bracket (20) allows the adapter bracket (23) and its contents to come to rest by sliding vertically to a rest position shown in FIG. 3 (i.e., with the pins (75A, 75B) and the main pin (80) of the mounting connector (70) traversing respective vertical portions of the cut-outs (55A, 55B, 55C) before engaging the body of the extension arms (23) and supporting the adapter bracket (20)). The configuration of FIGS. 1-3 disclosed herein provides a convenient mechanism to raise the adapter bracket (20) for storage in a limited space while simultaneously allowing the adapter bracket (20) to be lowered for use in an angled position as shown in FIG. 1.

Figure 4:
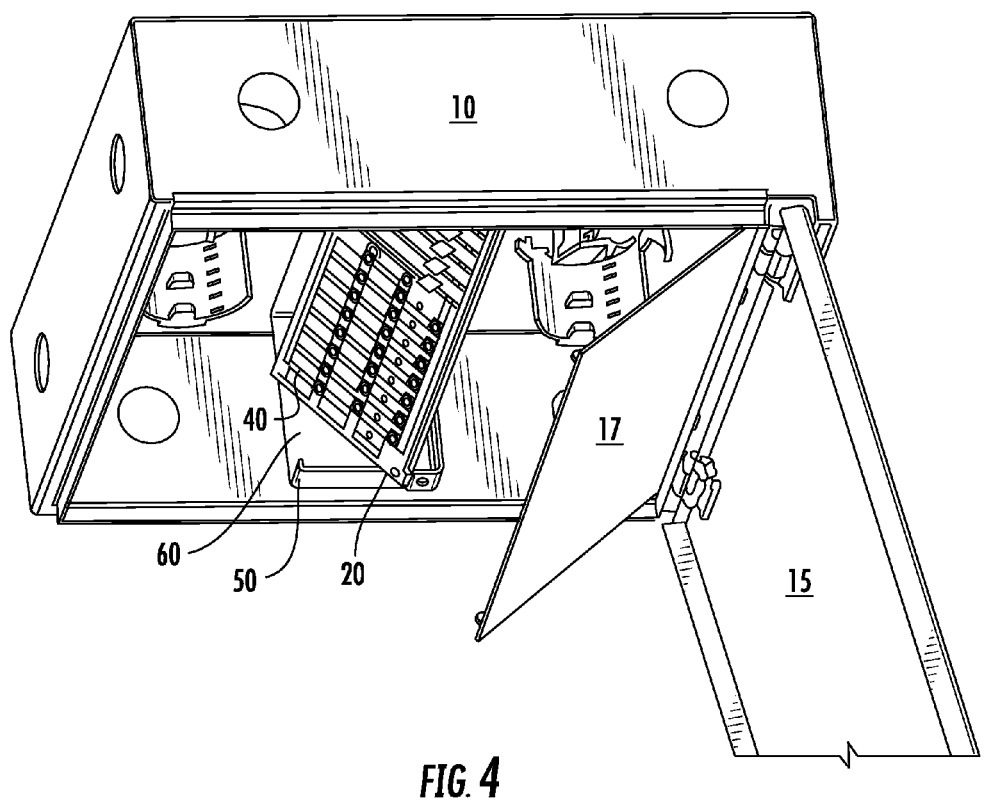
FIG. 4 is a perspective view of the fiber optic connectivity cabinet of the present invention in accordance with one embodiment.

FIG. 4 illustrates another arrangement with a similar concept as FIGS. 1-3. In FIG. 4, an adapter bracket (20) is shown as part of an overall assembly that includes the adapter bracket (20), an adapter bracket mounting bar (60), and an adapter bracket mounting connector (70). This configuration allows for an overhead mounting and storage arrangement for fiber optic connections to take advantage of the cabinet (10) in a ceiling or other overhead compartment. The assembly shown in FIG. 4 may also include a secondary, separate cover (17) for additional protection of the components in the cabinet (10). A lid (15) completes the housing and opens and closes for access.

Figure 5:
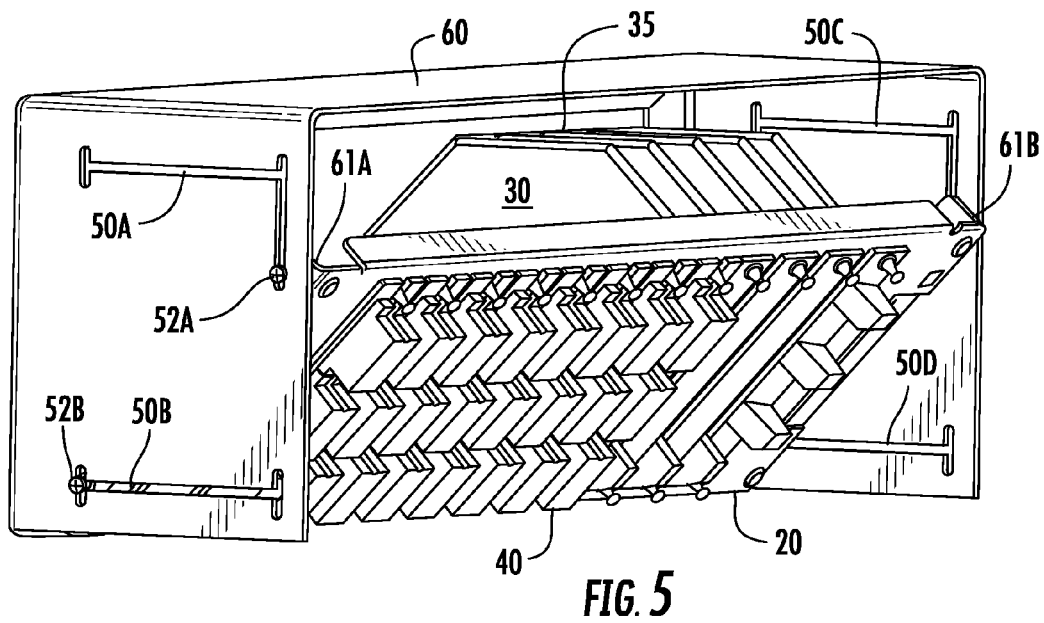
FIG. 5 is an isolated perspective view of the adapter bracket mounting bar taken from the embodiment of the present invention illustrated in FIG. 4.

FIG. 5 illustrates how the adapter bracket mounting bar (60) of FIG. 4 allows for three positions in regard to the adapter bracket (20). The adapter bracket (20) attaches to the mounting bar (60) via oppositely positioned sides (61A, 61B) of the adapter bracket (20) fitted with pairs of pins (52A, 52B, 52C, 52D) that engage grooves (50) in the mounting bar (60). The mounting bar (60), therefore, engages the adapter bracket (20) via pairs of pins (52A, 52B) on each side that mate with and slide along respective bar rail grooves (50) in the mounting bar (60). Each upper bar rail groove (50A, 50C) includes a vertical component and a horizontal component in which a respective pin (52) fits. Oppositely positioned lower bar rail grooves (50B, 50D)

provide horizontal tracks for their associated pins. The respective pins (52A, 52B) traverse the grooves to position each end of the adapter bracket (20). In the embodiment of FIG. 5, each mounting connector (70A, 70B) has a pair of pins (52A, 52B) positioned so that the adapter bracket (20) is in its most downwardly angled position (i.e., a convenient position for accessing the fiber connections from a ceiling installation). Sliding the upper pin (52A) up a vertical riser section of the upper groove (50A), on both sides of the mounting bar of course, positions the adapter bracket (20) in a near vertical position, which can be maintained by the upper pin (52A) entering a horizontal section of the upper groove (50A). Continuing to slide the upper pins (52A) along a horizontal section or track of the upper groove (50A) simultaneously slides the lower pin (52B) outwardly toward an end of the lower groove (50B) that is proximate the user. In this way, the adapter bracket (20) flips its position so that it is angled in its most upward orientation, most likely to be useful for storage. The mounting bar (60) shown in FIG. 5 connects to the cabinet (10) directly with standard screws and allows positional adjustments that orient the fiber connections for maximum utility in a situation at hand.

Figure 6:
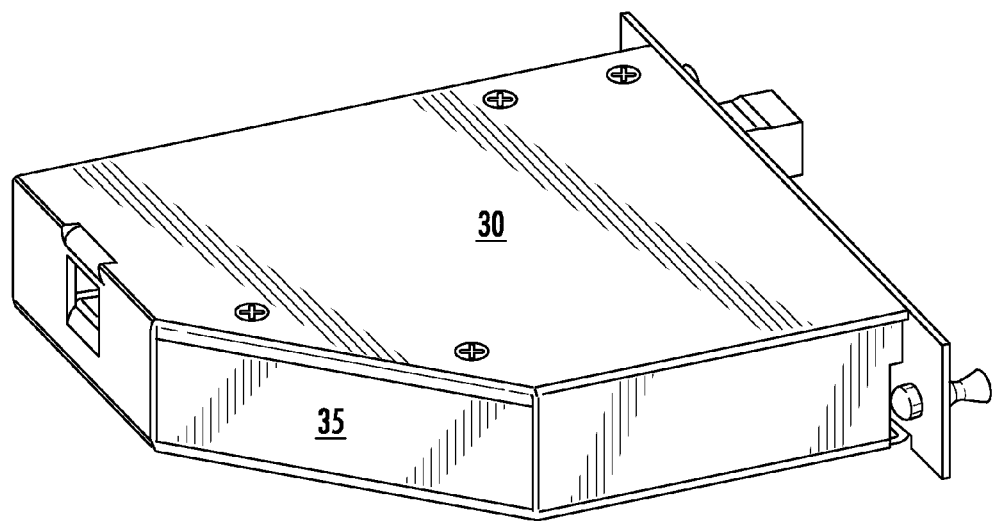
FIG. 6 is a perspective view of a plug-in cartridge.

The adapter bracket (20) and the mounting bar (60) provide an assembly that can adjust the angular position of the adapter bracket and its associated fiber installations. In conjunction with the positional advancements shown in FIG. 5, the illustration of FIG. 6 shows that a cartridge style fiber optic connector (e.g., the kind used for connecting fiber to electronics housed in the cartridge (30) and for splitting purposes to multi-point terminations) can be used in a way that has not been shown in the art of fiber housing previously, wherein the fiber optic splitter permits multiple fibers to be connected to a single input fiber, such that the power from the single input is divided equally amongst the multiple fibers to which it is connected. The contour (35) of the cartridge housing (30) provides a clearance allowing for angular displacement of the adapter bracket (20) as shown in FIG. 5. The sloped edge (35) of the cartridge (30) allows the mounting bar (60) shown in FIG. 5 to have a narrower height and a more compact profile overall, while still accommodating the pivoting of the adapter bracket (20) and the multi-position, angular displacement for all of the fiber connections.

Figure 7:
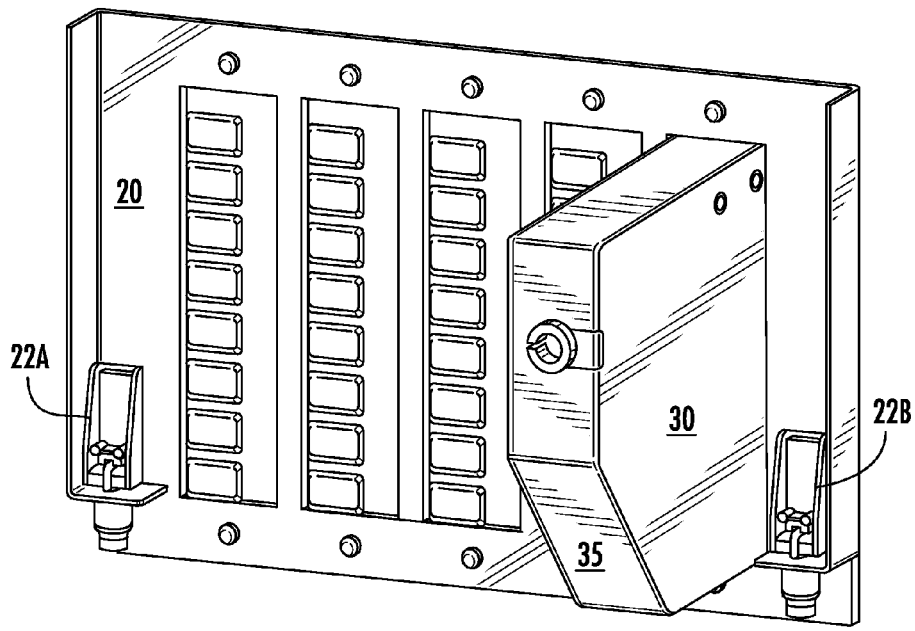
FIG. 7 is a perspective view of an adapter bracket.
Figure 8:
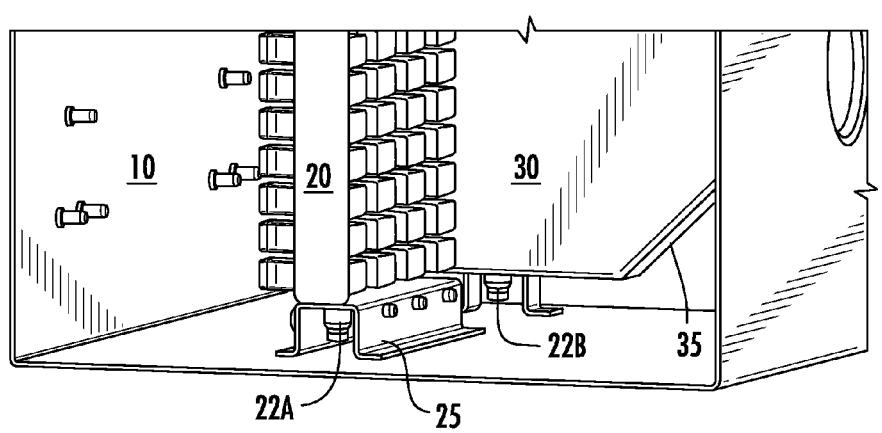
FIG. 8 is an isolated perspective view of an adapter bracket secured to the cabinet in a vertical orientation.

FIG. 7 and FIG. 8 also provide convenient installation advantages for adapter brackets (20) utilizing both adapter plates with fiber connectors and cartridge style electronic housings. In FIG. 7, swell latches (22A, 22B) provide the compression necessary to hold an adapter bracket (20) in a cabinet securely. FIG. 8 illustrates that the swell latches (22A, 22B) connect the adapter bracket (20) to a cabinet (10) via raised brackets (25). Again, the contour (35) of a cartridge housing (30) allows for access to a rear side of the cabinet (10) when the cartridge (30) is installed in a vertical orientation as shown, making use of a cartridge (30) shape in a conveniently new manner.

These features and others achieve new security and integrity for fiber optic connectivity systems in place today.

While the present invention has been shown and described in accordance with several preferred and practical embodiments, it is recognized that departures from the instant disclosure are contemplated within the spirit and scope of the present invention which are not to be limited except as defined in the following claims as interpreted by the Doctrine of Equivalents.

What is claimed is:

1. A fiber optic connectivity apparatus for managing fiber optic interconnections, said fiber optic connectivity apparatus comprising:
   a cabinet including an outer facing surface and an inner facing surface surrounding an interior cavity;
   an adapter bracket that is selectively positionable between a raised position and a lowered position relative to said cabinet, and said adapter bracket being configured for selective connection with at least one adapter component;
   a first mounting connector and an oppositely disposed second mounting connector each being secured to the inner facing surface of said cabinet, and each of said first and second oppositely disposed mounting connectors including a plurality of protruding components extending therefrom, said plurality of protruding components including a first pin, a second pin and central pin disposed between said first and second pins; and
   a first extension arm and an oppositely disposed second extension arm each being secured to said adapter bracket, and each of said first and second oppositely disposed extension arms defining a plurality of L-shaped cutout sections each being correspondingly aligned for engaged receipt of one of said plurality of protruding components to permit selective movement of said adapter bracket between the raised and lowered positions.

2. The fiber optic connectivity apparatus as recited in claim 1 wherein said cabinet further comprises a lid that is selectively displaceable for accessing the interior cavity of said cabinet.

3. The fiber optic connectivity apparatus as recited in claim 1 wherein said at least one adapter component is at least one fiber optic cartridge structured and disposed for deployment of a plurality of fiber optic channels contained in a single cable to separate channels, and said at least one fiber optic cartridge being sized and configured for selective connection with said adapter bracket.

4. The fiber optic connectivity apparatus as recited in claim 1 wherein said at least one adapter component is at least one adapter plate.

5. The fiber optic connectivity apparatus as recited in claim 1 wherein said plurality of L-shaped cutout sections comprises:
   a first L-shaped cutout section and a second L-shaped cutout section on each of said first and second extension arms, said first and second L-shaped cutout sections being correspondingly aligned with a respective one of said first and second pins, and each of said first and second L-shaped cutout sections extending to the peripheral edge of each said first and second extension arms such that said first and second pins may be selectively engaged and disengaged from said first and second L-shaped cutout sections, respectively;
   a third L-shaped cutout section that is disposed between said first and second L-shaped cutouts, said third L-shaped cutout section being correspondingly aligned for engaged receipt of said central pin; and
   wherein said adapter bracket is selectively positionable between a horizontal plane and a vertical plane relative to said cabinet along an arcuate pivoting motion line that is defined by said third L-shaped cutout section.

6. The fiber optic connectivity apparatus as recited in claim 1 further comprising a first swell latch and a second swell latch each being sized and configured for securing said adapter bracket to a respective raised mounting bracket that is secured to the inner facing surface of said cabinet.

7. A fiber optic connectivity apparatus for managing fiber optic interconnections, said fiber optic connectivity apparatus comprising:
- a cabinet including an outer facing surface and an inner facing surface surrounding an interior cavity;
- a lid on said cabinet that is selectively displaceable for accessing the interior cavity of said cabinet;
- an adapter bracket that is pivotally secured to the inner facing surface of said cabinet, said adapter bracket being selectively positionable between a raised position for storage and a lowered position for maintenance of the fiber optic interconnections;
- at least one fiber optic cartridge structured and disposed for deployment of a plurality of fiber optic channels contained in a single cable to separate channels, and said at least one fiber optic cartridge being sized and configured for selective connection with said adapter bracket; and
- said at least one fiber optic cartridge includes a sloped edge for permitting access to the inner facing surface of said cabinet.

8. The fiber optic connectivity apparatus as recited in claim 7 wherein said adapter bracket includes a fiber optic splitter that is structured and disposed for connecting a plurality of fibers with a single input fiber.

9. The fiber optic connectivity apparatus as recited in claim 7 further comprising:
- a first mounting connector and an oppositely disposed second mounting connector each being secured to the inner facing surface of said cabinet, and each of said first and second oppositely disposed mounting connectors including a plurality of protruding components extending therefrom; and
- a first extension arm and an oppositely disposed second extension arm each being secured to said adapter bracket, and each of said first and second oppositely disposed extension arms defining a plurality of L-shaped cutout sections each being correspondingly aligned for engaged receipt of one of said plurality of protruding components to permit selective movement of said adapter bracket between the raised and lowered positions.

10. The fiber optic connectivity apparatus as recited in claim 9 wherein said plurality of protruding components comprises:
- a first pin and a second pin; and
- a central pin that is disposed between said first and second pins.

11. The fiber optic connectivity apparatus as recited in claim 10 wherein said
- plurality of L-shaped cutout sections comprises:
- a first L-shaped cutout section and a second L-shaped cutout section on each of said first and second extension arms, said first and second L-shaped cutout sections being correspondingly aligned with a respective one of said first and second pins, and each of said first and second L-shaped cutout sections extending to the peripheral edge of each said first and second extension arms such that said first and second pins may be selectively engaged and disengaged from said first and second L-shaped cutout sections, respectively;
- a third L-shaped cutout section that is disposed between said first and second L-shaped cutouts, said third L-shaped cutout section being correspondingly aligned for engaged receipt of said central pin; and wherein said adapter bracket is selectively positionable between a horizontal plane and a vertical plane relative to said cabinet along an arcuate pivoting motion line that is defined by said third L-shaped cutout section.

12. The fiber optic connectivity apparatus as recited in claim 7 further comprising a first swell latch and a second swell latch each being sized and configured for securing said adapter bracket to a respective raised mounting bracket that is secured to the inner facing surface of said cabinet.

13. A fiber optic connectivity apparatus for managing fiber optic interconnections, said fiber optic connectivity apparatus comprising:
- a cabinet including a top surface, a bottom surface and a sidewall extending therebetween and surrounding an interior cavity, and said bottom surface being defined by a lid that is selectively displaceable for accessing the interior cavity of said cabinet;
- an adapter bracket that is pivotally secured to the inner facing surface of said cabinet, said adapter bracket being selectively positionable between a raised position for storage and a lowered position for maintenance of the fiber optic interconnections;
- at least one fiber optic cartridge structured and disposed for deployment of a plurality of fiber optic channels contained in a single cable to separate channels, and said at least one fiber optic cartridge being sized and configured for selective connection with said adapter bracket; and
- said at least one fiber optic cartridge includes a sloped edge for permitting access to the inner facing surface of said cabinet.

14. The fiber optic connectivity apparatus as recited in claim 13 further comprising a secondary protective cover that is pivotally secured to said cabinet such that said secondary protective cover may be selectively positioned between a closed position, wherein said secondary cover is adjacent to the sidewall of said cabinet, and an open position, wherein said secondary cover is pivotally rotated away from the sidewall of said cabinet for accessing the interior cavity of said cabinet.

15. The fiber optic connectivity apparatus as recited in claim 13 wherein the top surface of said cabinet is mountable.

16. The fiber optic connectivity apparatus as recited in claim 13 further comprising a first swell latch and a second swell latch each being sized and configured for securing said adapter bracket to a respective raised mounting bracket that is secured to the inner facing surface of said cabinet.

17. The fiber optic connectivity apparatus as recited in claim 13 further comprising:
- a first mounting connector and an oppositely disposed second mounting connector each being secured to the inner facing surface of said cabinet, and each of said first and second oppositely disposed mounting connectors including a first pin extending therefrom, a second pin extending therefrom and a central pin extending therefrom that is disposed between said first and second pins; and
- a first extension arm and an oppositely disposed second extension arm each being secured to said adapter bracket, and each of said first and second oppositely disposed extension arms defining a plurality of L-shaped cutout sections each being correspondingly aligned for engaged receipt of one of said first pin, said second pin or said central pin to permit selective movement of said adapter bracket between the raised and lowered positions, and said plurality of L-shaped cutout sections comprising:

a first L-shaped cutout section and a second L-shaped cutout section on each of said first and second extension arms, said first and second L-shaped cutout sections being correspondingly aligned with a respective one of said first and second pins, and each of said first and second L-shaped cutout sections extending to the peripheral edge of each said first and second extension arms such that said first and second pins may be selectively engaged and disengaged from said first and second L-shaped cutout sections, respectively;

a third L-shaped cutout section that is disposed between said first and second L-shaped cutouts, said third L-shaped cutout section being correspondingly aligned for engaged receipt of said central pin; and wherein said adapter bracket is selectively positionable between a horizontal plane and a vertical plane relative to said cabinet along an arcuate pivoting motion line that is defined by said third L-shaped cutout section.

\* \* \* \* \*